United States Patent Office 3,380,946
Patented Apr. 30, 1968

3,380,946
POLYMERIZATION USING PEROXYCARBONATE ESTERS WITH SALTS OF SULFUROUS ACID
John C. Crano, Akron, and Elizabeth K. Fleming, Barberton, Ohio, assignors to Pittsburgh Plate Glass Company, Pittsburgh, Pa., a corporation of Pennsylvania
No Drawing. Filed Oct. 22, 1965, Ser. No. 502,478
9 Claims. (Cl. 260—29.6)

ABSTRACT OF THE DISCLOSURE

Olefinically unsaturated polymerizable compounds especially those susceptible to free radical polymerization are polymerized using a redox-catalyst system of an organic peroxycarbonate ester and a salt of sulfurous acid. Polymerization temperatures below 50° C. are rendered feasible by recourse to the redox system, thus providing for polymers of improved properties.

---

This invention relates generally to the polymerization of olefinically unsaturated polymerizable compounds, notably compounds susceptible to free radical polymerization derived from ethylene, which contain the group:

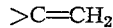

In particular, it relates to new redox-catalysts systems and method useful for producing low-temperature polymerization of such olefinic compounds. These systems are devised from organic peroxycarbonate polymerization catalysts and specific salts of sulfurous acid as redox agents.

Previously it has been known that free radical polymerization may be carried out at reduced temperatures by employing free radical initiators which function at lower temperatures. Further, it has been recognized that certain free radical initiating catalysts, such as various organic peroxides, could be employed in conjunction with specified redox systems to produce polymerization at reduced temperatures. Such a procedure is utilized in the production of "cold" rubber. It has also previously been known and described in U.S. Patent 2,464,062 that organic peroxydicarbonates, such as diisopropyl peroxydicarbonate, would initiate polymerization of unsaturated material such as styrene at temperatures below about 50° C. Benzoyl peroxide and related compounds used without activators generally require temperatures on the order of 50° C. to 80° C.

Polymerization at lower temperatures is desirable for a variety of reasons. For example, at low temperatures more facile temperature control and faster polymerization because of more rapid heat removal may be enjoyed. Good quality, high molecular weight polymer may thus be prepared. Further, in the preparations of copolymers of substances such as butadiene and isoprene which contain a second olefinic bond, polymerization at the usual high temperature leads to cross-linking and branch-chain formation.

Now it has been discovered that polymerization of unsaturated substances, notably ethylenically unsaturated polymerizable monomers, such as ethylene and derivatives of ethylene which are monosubstituted, or unsymmetrically disubstituted, viz., styrene, may be effectively polymerized at room temperatures (about 25° C.) or even lower, by conducting the polymerization in the presence of a redox system with a catalyst which is an organic peroxycarbonate, for example, a dialkyl peroxydicarbonate or an alkyl monoperoxycarbonate. As a result of this discovery of new redox systems, high polymerization yields are easily obtainable which previously could be obained only at elevated temperatures and with high catalyst concentration.

By the utilization of this discovery, uniform polymers may be obtained. Frequently by low-temperature polymerization higher-melting polymers may be obtained which have previously been obtainable only by higher temperature polymerization. Often these higher-melting polymers are more stable and less readily decomposed by thermal means. Further, copolymers and homopolymers involving monomers like butadiene, isoprene, and chloroprene may be obtained by low-temperature polymerization with little or no cross-linking. This makes possible the preparation of fusible polymers containing olefinic unsaturation which may be utilized in subsequent cross-linking. Many other advantages may also be realized by the practice hereof, as will be apparent hereinafter.

In accordance herewith, polymerization of unsaturated polymerizable compounds, notably ethylene, monosubstituted ethylenes and unsymmetrically disubstituted ethylenes is induced by proper use of small quantities of organic peroxycarbonates, notably diisopropyl peroxydicarbonate. Thus, a combination of peroxycarbonate ester, such as O,O-tertiarybutyl-O-isopropyl monoperoxycarbonate or diisopropyl peroxydicarbonate, and a water soluble salt of sulfurous acid, such as sodium metabisulfite (pyrosulfite), is used in liquid phase polymerization of ethylenically unsaturated monomers, ideally in a heterogeneous aqueous polymerization medium. In such aqueous polymerization medium a solution of peroxycarbonate in liquid monomer is agitated with an aqueous solution to distribute the organic liquid in the aqueous medium containing emulsifying agent and redox agent (water soluble salt of sulfurous acid) whereby to effect polymerization of the ethylenically unsaturated monomer at reduced temperature in an emulsion or dispersion.

In accordance with the procedure disclosed herein, agitation of an aqueous polymerization medium containing emulsifying agent and water soluble salt of sulfurous acid with a liquid monomer containing peroxycarbonate catalyst results in suspension or emulsion polymerization. Usually emulsion polymerization occurs and is preferred, but may occur with some amount of suspension polymerization. Emulsion polymerization is characterized by the formation of droplets or particles of 0.5 micron or less, while suspension polymerization is generally characterized by particles of 5 micron or larger size. Moreover, the continuous phase of the emulsion is generally the aqueous phase although rarely the phases are reversed to result in a continuous oil phase. Often no suspension polymerization will result in a system which readily results in emulsion polymerization.

In the practice of this invention, an aqueous solution containing an emulsifying agent such as nonylphenoxypoly(ethyleneoxy) ethanol (Igepal CO-630) or sodium lauryl sulfate (Duponol ME) and a redox agent, such as is described hereinafter and typified by sodium metabisulfite, is prepared. This aqueous solution is then cooled to about 5° C., or other suitable low temperature, prior to combination with ethylenically unsaturated material such as styrene to which monomer has previously been added an effective quantity of an organic peroxycarbonate such as a dialkyl peroxydicarbonate or an alkyl monoperoxycarbonate which peroxycarbonates are described in more complete detail hereinafter. After agitation at a reduced temperature, such as room temperature (about 25° C.) or even lower, for a period of time, suitably for 4 hours or more, the resulting polymerization emulsion may be separated to recover polymer and unconverted monomer. The separation of the polymerization emulsion may be accomplished by dilution with a solvent to cause stratification into an organic and an aqueous phase. Heptane may be employed for this purpose.

The unsaturated materials which may be polymerized by the practice of this invention are ethylenically unsaturated compounds, more specifically ethylene and monosubstituted and unsymmetrically disubstituted ethylenes containing up to 20 carbon atoms. These compounds include esters, nitriles, and organic halogen compounds which are olefinically unsaturated compounds of both aromatic and aliphatic types. Heterocyclic compounds, viz., vinylpyrrolidone, which contain ethylenic unsaturation in a size chain are also included. By way of illustration, vinyl esters such as vinyl acetate, vinyl propionate, vinyl butyrate, vinyl isobutyrate, and other vinyl esters containing as many as 18 carbon atoms in the acid moiety, may be polymerized in accordance herewith.

Other vinyl derivatives, such as vinyl chloride, vinyl fluoride, styrene, nuclear substituted styrenes including o-methyl, m-methyl, p-methylstyrene, divinylbenzene, and other related compounds may also be polymerized in accordance herewith. Vinylidene derivatives, e.g. vinylidene derivatives, e.g. vinylidene chloride, respond to this polymerization also.

The acrylates respond particularly well to the techniques disclosed herein and the invention extends to include acrylates and methacrylates containing up to 16 carbon atoms in the alcohol moiety. By way of illustration, methyl methacrylate, ethyl acrylate, propyl acrylate, butyl acrylate, isobutyl acrylate, decyl acrylate, dodecyl methacrylate, and other related compounds respond to treatment set forth herein.

Other materials susceptible to the practice hereof include: acrylonitrile, α-methacrylonitrile, certain allyl esters, viz. the bis-allyl carbonate ester of diethylene glycol, etc., and many related compounds and certain propylene derivatives, such as isopropenyl bromide, chloride, and acetate.

Copolymers of the aforementioned unsaturated materials may be obtained. Among the more important copolymers which may be prepared in accordance herewith are: copolymers of butadiene, acrylonitrile, isoprene, vinyl acetate, vinylidene chloride, methyl acrylate, and divinylbenzene with styrene, butadiene with acrylonitrile, butadiene with chloroprene, isoprene with acrylonitrile, styrene with methyl acrylate, styrene with vinylidene chloride, chloroprene with acrylonitrile, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, and styrene mixtures and other mixtures wherein vinyl acetate, isoprene, or methyl methacrylate may be components of the terpolymers.

Useful emulsifying agents may be nonionic, cationic, or anionic, as well as mixtures thereof. Mixtures of emulsifying agents often produce enhanced results. Examples of suitable emulsifying agents which may be employed herein include the following, but it is not intended to exclude many similar emulsifying agents which are not disclosed herein, as well as mixtures of emulsifying agents:

Anionic.—Sodium lauryl sulfate (Duponol ME), sodium alkylnaphthalenesulfonate (Ketal BX–78), sodium salt of sulfated alkylphenoxypolyoxyethylene (Alipol CO–433), complex organic phosphate (Gafac RE–610).

Nonionic.—Nonylphenoxypoly (ethyleneoxy) ethanols (Igepal CO–630 and CO–880), polyoxyethylated fatty alcohol (Emulphor ON–870).

Amphoteric.—Hydroxylated phosphatides of soybean oil complex (hydroxy lecithin).

Organic peroxycarbonates which are useful in the practice of this invention contain the group:

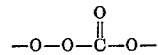

This group is present in both the organic peroxydicarbonates and the organic monoperoxycarbonates. In the organic monoperoxycarbonates, such a group may be attached to alkyl groups or substituted alkyl groups which are the same or different groups on opposite ends of the percarbonate group. In the organic peroxydicarbonates, such a group is linked through the peroxy oxygen to a second carbonyl group as in the carbalkoxy group and the carbonate group is linked directly to an alkyl group or substituted alkyl group, which may be identical or different from the alkyl group contained in the carbalkoxy group. Such alkyl groups or substituted alkyl groups attached to the peroxycarbonate group are organic radicals derived from alcohols containing up to 18 carbon atoms, such as methyl, ethyl, isopropyl, n-propyl, isobutyl, n-butyl, lauryl, amyl, hexyl, and octadecyl peroxydicarbonates. Corresponding unsaturated aliphatic peroxydicarbonates may also be employed, such as the allyl, methallyl, crotyl, vinyl, propargyl, or 2-chloroallyl, peroxydicarbonates. Araliphatic, heterocyclic, aromatic, and cycloaliphatic derivatives, such as benzyl, cyclohexyl, tetrahydrofurfuryl, and cinnamyl peroxydicarbonates, also may be used according to this invention. Moreover, more complex peroxydicarbonates such as bis-(2-nitro-2-methylpropyl)-peroxydicarbonates and the products derived by reaction of the chloroformates of monohydroxy acids or their esters (ethyl lactate, ethyl glycollate, ethyl salicylate, methyl lactate, etc.) with sodium peroxide, may be used as herein contemplated.

Among the O,O-alkyl-O-alkyl monoperoxycarbonates which are herein contemplated are those compounds derived from chloroformates of aliphatic alcohols, or substituted aliphatic alcohols containing up to 18 carbon atoms in the alcohol moiety of the chloroformates and hydroperoxides derived from aliphatic or substituted aliphatic alcohols containing up to 18 carbon atoms in the hydroperoxide moiety of the monoperoxycarbonate. Specific monoperoxycarbonates include: O,O-ethyl-O-methyl monoperoxycarbonate, O,O-isopropyl-O-isopropyl monoperoxycarbonate, O,O-tertiarybutyl-O-isopropyl monoperoxycarbonate, O,O-tertiary-butyl-O-benzyl monoperoxycarbonate, O,O-tertiarybutyl-2,3-chloroethyl monoperoxycarbonate, O,O - ethyl-O-isopropyl monoperoxycarbonate, O,O-isopropyl-O-dodecyl monoperoxycarbonate, O,O-n-amyl-O-dodecyl monoperoxycarbonate, O,O-tertiaryamyl-O-dodecyl monoperoxycarbonate, O,O-tertiary-butyl-O-octadecyl monoperoxycarbonate, O,O-tertiaryamyl-O-octadecyl monoperoxycarbonate, O,O-tertiarybutyl-O-methyl monoperoxycarbonate, O,O-tertiarybutyl-O-ethyl monoperoxycarbonate, O,O-tertiarybutyl-O-propyl monoperoxycarbonate, O,O-tertiarybutyl-O-butyl monoperoxycarbonate, O,O-tertiarybutyl-O-isobutyl monoperoxycarbonate, O,O-tertiaryamyl-O-isopropyl monoperoxycarbonate, O,O - tertiaryamyl-O-tertiarybutyl monoperoxycarbonate, and O,O-(1-methylcyclohexyl)-O-isopropyl monoperoxycarbonate. Also contemplated are the polymeric peroxydicarbonates obtained by reacting ethylene glycol dichloroformate, or diethylene glycol dichloroformate, or a dichloroformate of other glycols or polyglycols (and such other peroxydicarbonates as may be described or suggested in U.S. Patent 2,370,588) with sodium peroxide.

The peroxycarbonate esters are usually water insoluble liquids, but sometimes are white crystalline solids at room temperature. They are usually soluble in the polymerizable monomers at or below the temperature of polymerization. The percarbonate esters, and particularly the liquid esters, slowly decompose at normal room temperatures and may decompose spontaneously at slightly higher temperatures. Since the decomposition reaction is exothermic, the heat generated by slow decomposition at normal room temperature may cause an elevation of the temperature within the mass and induce rapid decomposition. Accordingly, the percarbonates should be refrigerated or otherwise stabilized prior to use. The stabilization may be effected by cooling to 0° C. or lower by suitable cooling medium, for example, solid carbon dioxide. The stabilization may be effected also by dissolving up to one percent of iodine in the liquid percarbonate and washing the iodine out just prior to the use.

The redox agents employed herein are the water soluble salts of sulfurous acid. Sulfurous acid is diprotic and therefore forms such salts as sulfites, bisulfites or hydrogen sulfites, and metabisulfites or pyrosulfites. The alkali and alkaline earth metal salts of sulfurous acid, especially the sodium and potassium salts, are especially useful and are preferred. Other sulfurous acid salts even though sparingly soluble in water such as ferrous sulfite and cadmium sulfite are useful. Specific salts of sulfurous acid which may be employed in accordance herewith are: sodium sulfite, sodium bisulfite, sodium metabisulfite, potassium sulfite, potassium bisulfite, potassium metabisulfite, ammonium sulfite, ammonium bisulfite, lithium sulfite, lithium bisulfite, lithium metabisulfite, magnesium sulfite, rhodium sulfite, thallium sulfite, and zinc sulfite.

The temperature used in the practice hereof may be any temperature from −35° C. to 100° C., although the vapor pressure of certain monomers would require that the reaction be carried out under pressure sufficient to maintain the monomer as a liquid at the chosen temperature. Moreover, temperatures below approximately 0° C. require special apparatus for cooling and precaution against ice formation on the cooling coils must be taken. Hence, a non-participating water-soluble organic solvent, such as acetone or methanol, is required to be added when it is desired to conduct polymerization at temperatures below 0° C. At temperatures approaching the normal boiling point of the liquid medium, the reaction may become uncontrollably rapid when, by way of illustration, the emulsion polymerization herein disclosed, is applied to styrene. The medium has a boiling point near 100° C. and utilization of such a high temperature with the herein disclosed redox-catalyst system would result in a polymerization rate of very violent intensity. However, when it is desired to employ high temperatures in the utilization of those redox-catalyst systems, the polymerization may be conducted at a controllable rate by reducing the concentration of the redox agent. Temperatures such as those above 50° C. in general have a tendency to produce polymers lacking the improved properties obtained by polymerization at lower temperatures, such as room temperature or even lower. Thus, while it is feasible to employ the redox catalyst system disclosed herein at temperatures from −35° C. to 100° C., benefits are greatest with temperatures from approximately −20° C. to approximately 50° C.

The concentration of the various components utilized in the practice hereof may be varied over extremely wide ranges. The amount of aqueous phase employed may vary from a few percent by weight of the monomer phase to many times the weight of the monomer phase. However, the relationship of aqueous phase to organic phase is dependent upon the type of emulsion desired and the particular monomer which is being polymerized. Generally, from 50 parts to 1,000 parts of water per 100 parts by weight of monomer is preferred. When it is desired to polymerize styrene, employing the technique herein described, a suitable ratio is 220 parts of water per 100 parts of monomer by weight. Increasing the quantity of water greatly requires an increase in the quantity of redox agent employed, whereas a decrease in the quantity of water often results in too rapid polymerization.

In the preparation for polymerization, the selected peroxycarbonate is dissolved in the monomer by stirring. The amount of peroxycarbonate employed depends on the particular peroxycarbonate selected. Generally adequate initiation of polymerization may be obtained dissolving 0.001 mole of peroxycarbonate in the monomer per mole of monomer. When the particular peroxycarbonate is diisopropyl peroxydicarbonate, a suitable polymerization is initiated by employing as little as 0.02 percent or even less of diisopropyl peroxydicarbonate by weight of monomer. Utilization of more than 2.0 percent of diisopropyl peroxydicarbonate by weight of styrene results in an uncontrollably rapid polymerization at 5° C. Thus, it is preferred to employ from 0.02 to 2.0 percent diisopropyl peroxycarbonate by weight of monomer. Many monomers are polymerized at preferred rates by the utilization of 0.5 percent diisopropyl peroxycarbonate by weight of monomer. Other peroxycarbonates, such as O,O-tertiarybutyl-O-isopropyl monoperoxycarbonate, usually require that a different quantity be employed in accordance with the oxygen equivalent of the particular peroxycarbonate. By way of example, if O,O-tertiarybutyl-O-isopropyl monoperoxycarbonate is utilized to polymerize styrene a suitable initiation is provided with about from 0.5 to 1.0 percent catalyst by weight of styrene. Generally, concentrations of from about 0.02 to 2.0 percent by weight of monomer are effective to adequately initiate polymerization when used in conjunction with the redox agents contemplated herein recognizing the existing variability in activity with the different useful catalysts illustrated hereinbefore.

The weight ratio of redox agent to peroxycarbonate depends upon the particular redox agent and particular peroxycarbonate selected, as well as upon the amount of monomer and amount of aqueous phase. Thus, when polymerizing styrene with diisopropyl peroxydicarbonate, a preferred amount of sodium metabisulfite is approximately 0.20 gram in 220 grams of water per 100 grams of styrene monomer containing 0.39 gram of diisopropyl peroxydicarbonate. Thus, approximately 0.50 part by weight of redox compound is preferred per part of peroxycarbonate. In general, more than 0.1 part by weight of redox compound per part of peroxycarbonate, but less than 3.0 parts by weight of redox compound per part of peroxycarbonate is required. Ratios of redox compound to peroxycarbonate outside of this range generally give rates of reaction which are too slow at the high ratio. Preferred ratios are generally about 0.50 part by weight of redox compound per part of peroxycarbonate.

The amount of redox agent required is approximately proportional to the amount of unsaturated monomer employed and may also vary within wide limits. When 220 parts of water per 100 parts of monomer are employed, the amount of redox agent may be selected from 0.05 part to as much as 10.0 parts of redox agent per 100 parts of monomer by weight. In the polymerization of styrene good results may be obtained by employing from 0.06 to 1.0 part of redox agent per 100 parts of monomer by weight. In the polymerization of styrene good results may be obtained by employing from 0.06 to 1.0 part of redox agent per 100 parts of monomer by weight.

The amount of emulsifier is selected in accordance with the condition of the emulsion obtained under reaction conditions. It is generally desirable to produce the emulsion of the monomer in the aqueous phase so that the solid polymer at completion of the conversion has the consistency of sand, or in other cases so that a cream results. Since creams generally require greater quantities of emulsifying agent than do emulsifications containing larger droplets, it is necessary to select the amount of emulsifying agent in accordance with the result sought. However, when 220 parts of water are employed per 100 parts by weight of monomer, a satisfactory amount of emulsifier is from 2 to 20 parts of emulsifier per 100 parts of monomer by weight. The nature of the emulsifying agent, i.e. whether ionic or nonionic, appears to have little effect on the quantity of emulsifier utilized. Further, either anionic or cationic emulsifying agents may be employed. However, the rate of polymerization and yield of polymer is dependent to some degree upon the type and amount of emulsifying agent employed.

As in other polymerizations, the presence of an oxidizing atmosphere has an adverse influence on the yields of polymer and the properties of the polymer, such as molecular weight. Thus, it is preferred to carry out the polymerization in accordance herewith by also excluding air from the reaction system. This may be accomplished most readily by displacing air from the apparatus used in carrying out the polymerization by an inert gas such as nitrogen.

Substances foreign to the polymerization are generally not desirable in either the organic medium or the aqueous medium. However, many substances may be present without harmful effect, viz. certain salts may be added to alter the density of the aqueous layer to facilitate subsequent separation of layers providing they are otherwise inert. Sodium hydroxide or other alkaline material is sometimes desirable to prevent hydrolysis of the emulsifying agent. Also, inert solvent may be incorporated in either layer. Thus, for certain purposes, substances may be added which do not contribute to the polymerization per se provided that these be inert.

The invention described herein may be better understood by reference to the following examples. It is not intended, however, that the invention be construed as limited thereby.

Example I

A standard polymerization bottle was equipped with means for introducing solutions and an inert gas to provide an atmosphere free of oxygen and to permit introduction of the various components. Samples could also be withdrawn at intervals as required.

An aqueous solution of 220 grams of water and 0.05 gram of dissolved sodium metabisulfite (pyrosulfite) was introduced into the pressure apparatus. Nonylphenoxypoly (ethyleneoxy) ethanol (Igepal CO–630), 10 grams, was also dissolved in the aqueous solution. The unsaturated material, 100 grams of styrene containing 0.39 gram of dissolved diisopropyl peroxydicarbonate, was cooled to 0° C. separately, while the apparatus was flushed with nitrogen to remove air. After flushing the bottle, the contents were cooled to 5° C. and the cooled unsaturated material containing peroxydicarbonate was introduced. Agitation was provided by tumbling the pressure bottle in a thermostat at 25° C. After 4 hours, conversion reached 40 percent by weight and the terminal conversion was 80 percent by weight of the monomer charged.

Example II

The procedure of Example I was followed using 200 grams of water, 0.5 gram of sodium metabisulfite, 2.0 grams of sodium lauryl sulfate (Duponal ME), 50 grams of styrene, and 0.5 gram of O,O-tertiarybutyl-O-isopropyl monoperoxycarbonate to prepare the polymerization system. The emulsion was agitated at 30° C. After 2 hours, conversion reached 49 percent by weight and the terminal conversion was 86 percent by weight of the monomer charged.

Example III

The procedure of Example II was followed except that 220 grams of water, 5.0 grams of sodium lauryl sulfate, and 50 grams of vinylidene chloride were substituted for the respective components in the polymerization system preparation. After 15 minutes the conversion was 60 percent by weight and after 30 minutes the conversion was 86 percent by weight of the monomer charged.

Example IV

Peroxycarbonates which may be substituted for diisopropyl peroxydicarbonate in Example I include: diisobutyl peroxydicarbonate, di-n-butyl peroxydicarbonate, di-n-propyl peroxydicarbonate, di(2-nitro-2-methylpropyl) peroxydicarbonate, dibenzyl peroxydicarbonate, di(2-chloroethyl) peroxydicarbonate, O,O-tertiaryamyl-O-isopropyl monoperoxycarbonate, O,O-isopropyl-O-isopropyl monoperoxycarbonate, O,O-tertiarybutyl-O-ethyl monoperoxycarbonate, and O,O-tertiaryamyl-O-tertiarybutyl monoperoxycarbonate.

In lieu of sodium metabisulfite in Example I, other redox agents may be employed as follows: potassium metabisulfite, lithium metabisulfite, sodium sulfite, potassium sulfite, lithium sulfite, sodium bisulfite, potassium bisulfite, and lithium bisulfite.

Other unsaturated materials which may be polymerized or copolymerized by the procedure of Example I are: vinyl chloride, divinyl benzene, butadiene, acrylonitrile, methacrylonitrile, methyl acrylate, ethyl acrylate, and bisallyl carbonate of diethylene glycol.

Alternately, an aqueous buffer solution may be substituted for water in the contemplated polymerization system. Often, the control of pH produces enhanced results. Such buffer solutions may be provided by aqueous solutions of an alkaline agent such as sodium hydroxide plus buffer reagent such as potassium dihydrogen phosphate and potassium biphthalate.

The technique illustrated hereinbefore for the preparation of the polymerization system may be altered for convenience. Thus, catalyst may be injected into the polymerization emulsion after it has been equilibrated at the polymerization temperature. Likewise, the choice of reactor may be varied. Rocking or internally stirred autoclaves work well for the polymerization contemplated herein.

The polymerization may be performed on a continuous or semi-continuous basis. One convenient method of providing a continuous or semi-continuous system is by employing a series of reactors of autoclaves to which the polymerization emulsion is continuously added while a polymer slurry is continuously removed therefrom. Uniform retention times may be provided by predetermined flow rates of the reactants.

There have been set forth hereinbefore the various groups of redox compounds which are useful in practicing this invention. Many compounds having the proper elements of structure may be selected without departing from the spirit of the invention. It is not intended that the invention be limited to the previously disclosed types of compounds since one skilled in the art can readily conceive of variations which encompass water soluble salts of sulfurous acid that are not specifically described hereinbefore.

While the invention has been described with reference to the details of certain specific embodiments, it is not intended that the invention be limited thereto except insofar as may appear in the appended claims.

We claim:

1. A method of catalytically polymerizing a polymerizable ethylenically unsaturated compound which comprises polymerizing the compound by contacting said compound with an organic peroxycarbonate ester and an aqueous solution of a salt of sulfurous acid.

2. A method of catalytically polymerizing an ethylenically unsaturated monomer which comprises contacting in an emulsion at −35° C. to 100° C. said monomer with an organic peroxycarbonate ester and an aqueous medium containing a water soluble salt of sulfurous acid and an emulsifying agent, whereby to polymerize catalytically the monomer and form an emulsion containing polymer of said monomer.

3. The method of claim 2 wherein the salt of sulfurous acid is sodium metabisulfite and the peroxycarbonate ester is O,O-tertiarybutyl-O-isopropyl monoperoxycarbonate.

4. The method of claim 2 wherein the salt of sulfurous acid is selected from the group consisting of sodium metabisulfite, ammonium metabisulfite and potassium metabisulfite.

5. The method of claim 2 wherein the salt of sulfurous acid is selected from the group consisting of alkali and alkaline earth metal salts and the peroxycarbonate ester is an O,O-alkyl-O-alkyl monoperoxycarbonate.

6. The method of claim 2 wherein the peroxycarbonate ester is diisopropyl peroxydicarbonate.

7. The method of claim 2 wherein the peroxycarbonate ester is O,O-tertiarybutyl-O-isopropyl monoperoxycarbonate.

8. The method of claim 2 wherein a mixture of ethylenically unsaturated monomer is polymerized.

9. A method of catalytically polymerizing an ethylenically unsaturated monomer which comprises effecting polymerization by contacting in an emulsion at temperatures of below 50° C. said monomer with an organic peroxycarbonate ester and an aqueous medium containing a water soluble salt of sulfurous acid and an emulsifying agent, whereby to form an emulsion containing polymer of said monomer.

References Cited
UNITED STATES PATENTS

| | | | |
|---|---|---|---|
| 2,391,218 | 12/1945 | Bacon et al. | 260—94.9 |
| 2,475,628 | 7/1949 | McSweeney | 260—94.9 |
| 3,043,823 | 7/1962 | Mantell et al. | 260—94.9 |
| 3,312,679 | 4/1967 | Crano | 260—93.5 |

MURRAY TILLMAN, *Primary Examiner.*

G. F. LESMES, W. J. BRIGGS, *Assistant Examiners.*